Oct. 16, 1962 E. J. MADDEN 3,058,239
SPHERICAL TRACKING, PLOTTING AND PROJECTION APPARATUS
Filed Oct. 16, 1958 3 Sheets-Sheet 1
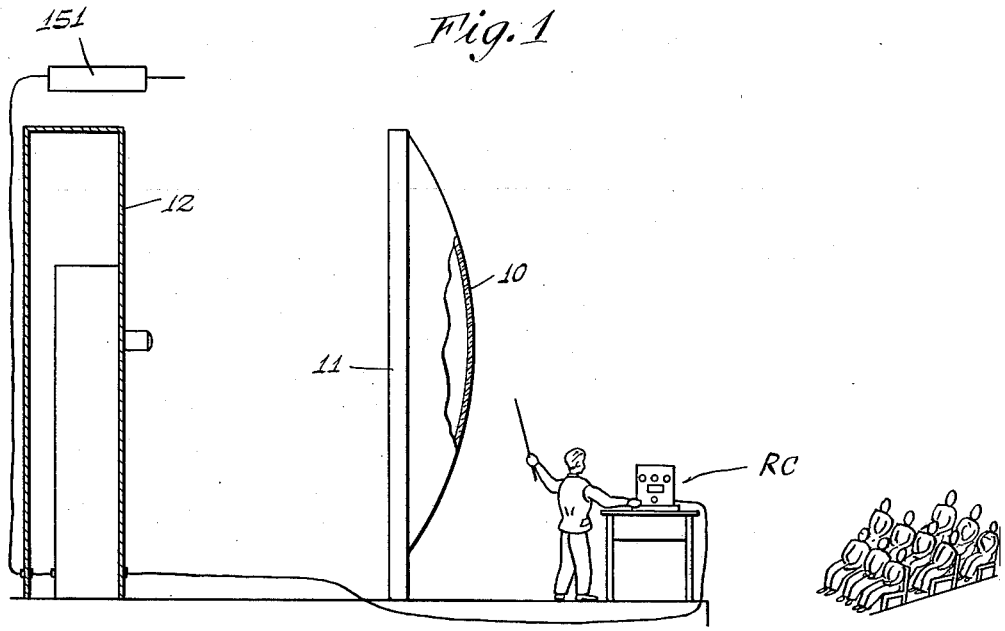
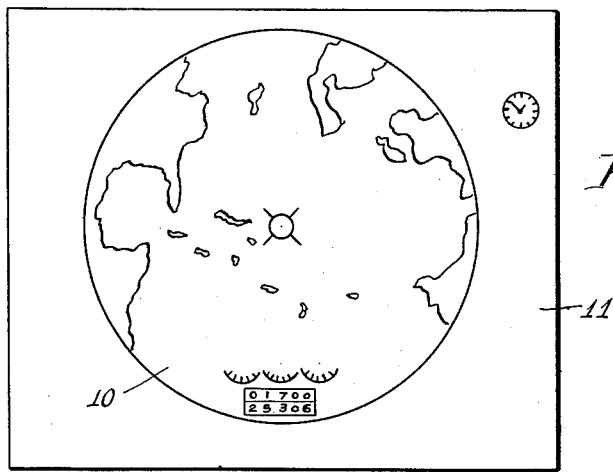
INVENTOR.
Edward J. Madden
BY
AGENT Oct. 16, 1962   E. J. MADDEN   3,058,239
SPHERICAL TRACKING, PLOTTING AND PROJECTION APPARATUS
Filed Oct. 16, 1958   3 Sheets-Sheet 2
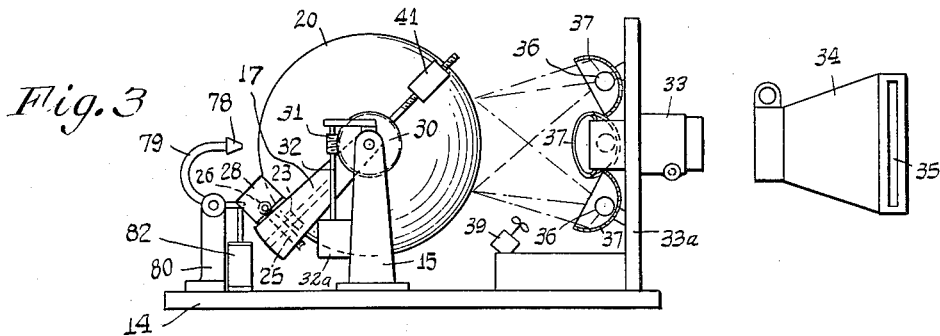
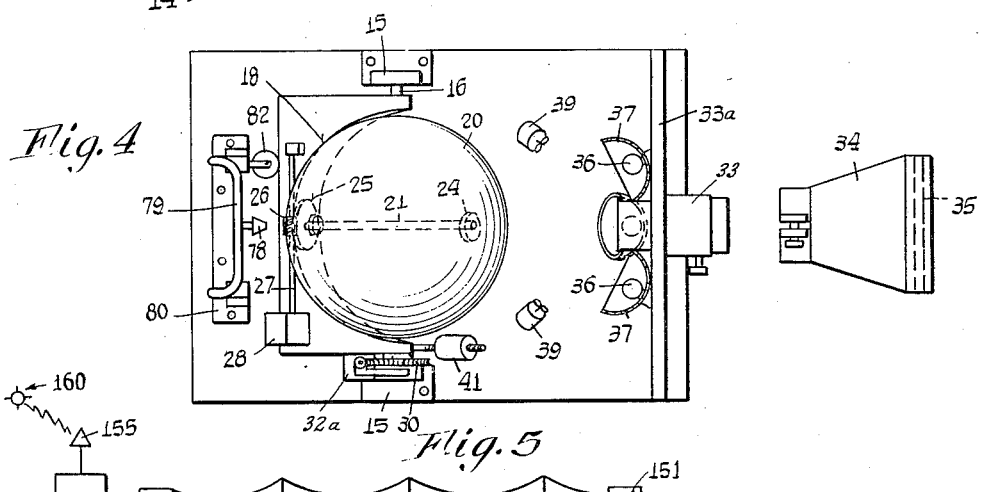
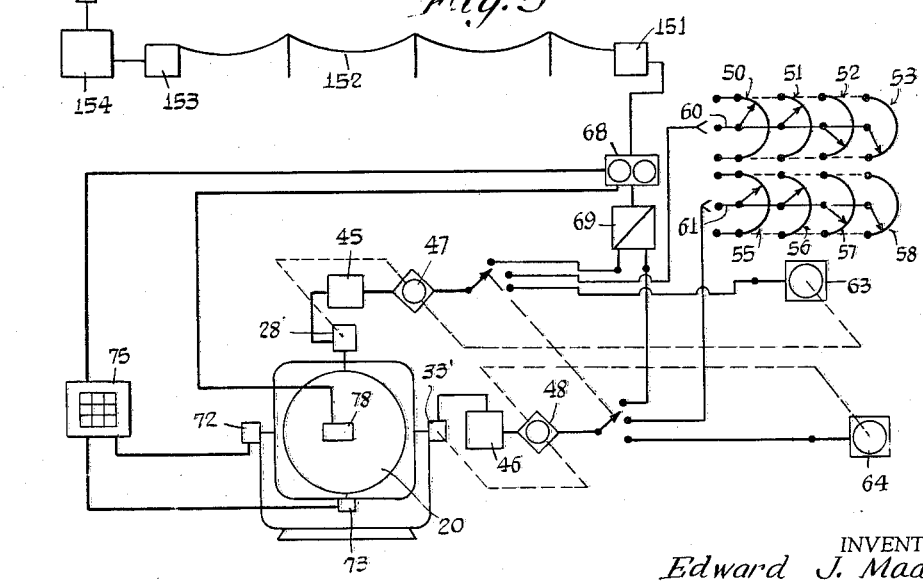
INVENTOR.
Edward J. Madden
BY
H. Gibner Lehmann
AGENT Oct. 16, 1962 E. J. MADDEN 3,058,239
SPHERICAL TRACKING, PLOTTING AND PROJECTION APPARATUS
Filed Oct. 16, 1958 3 Sheets-Sheet 3

INVENTOR.
Edward J. Madden
BY
H. Gibner Lehmann
AGENT 3,058,239
SPHERICAL TRACKING, PLOTTING AND
PROJECTION APPARATUS
Edward J. Madden, P.O. Box 461, Rte. 4,
Alexandria, Va.
Filed Oct. 16, 1958, Ser. No. 767,657
11 Claims. (Cl. 35—46)

This invention relates to plotting and/or tracking and projection means such as are adapted to trace and display the positions and movements of objects traveling with respect to the surface of a sphere, and more particularly to automatic and semi-automatic, power-controlled apparatus for the above and similar purposes.

The invention is particularly useful in connection with objects which are movable with respect to the earth's surface, including space objects such as heavenly bodies, man-made satellites, water-borne objects such as boats, submarines and the like; the present application involves subject matter related to that of my copending application Serial No. 619,820, filed November 1, 1956, now U.S. Patent No. 3,003,257, and entitled "Method and Means for Displaying Positions and Motions of Objects in Relation to the Earth."

In my copending application referred to there is disclosed a tracking and display apparatus comprising a globe or sphere having on its surface a map of the world, and having within it an optical projection means by which portions of the said map may be projected onto a large screen or the like, for viewing by a group. The globe is mounted for rotation about two axes normal to each other, and is motor driven whereby it may be remotely controlled to project successive areas of the said map surface, corresponding to the path of travel of an object with respect to the earth's surface. The tracking may be effected by control equipment, receiving information from radio stations or transmitters which are supplied with data relating to the flight.

By the present invention there are provided novel combinations of control equipment for the above purposes, in conjunction with a spherical member or globe and associated mounting means, by which effective spherical plotting and tracking of the movements of objects with respect to the earth's surface may be readily accomplished.

Among the objects of the present invention is the provision of a novel and improved globe and mounting structure for use with a spherical plotter or the like, wherein a maximum area of the spherical surface is available for projection while at the same time an advantageous simplification of structure is effected. This is accomplished, in accordance with the invention, by the provision of a globe structure supported for rotation about two axes normal to each other, said structure being characterized by solely one shaft which projects from the surface of the globe at solely one point thereon, said shaft being carried by a semicircular yoke member which extends along a portion of the circumference of the globe.

A feature of the invention resides in the provision of an improved globe construction as above set forth, wherein relatively small forces are required to turn the globe about either of its two axes.

A further object of the invention is to provide a novel globe or spherical plotter construction, wherein readings or data may be provided for storage on the surface of the globe, and wherein such information is readily available at any time for use, or for storage and subsequent use.

Another object of the invention is to provide, in a spherical plotter and tracking apparatus, a novel control organization in conjunction with a globe structure which is to be rotated about two axes, whereby turning of the latter about one axis or the other or both may be very quickly and accurately effected to enable an accurate tracking to be had of a moving object, and also a projection of the path of movement of the said object.

A further object of the invention is to provide an improved control apparatus and globe as above set forth, wherein various types of signals or data may be utilized to effect automatic movements of the globe, as by the provision of data conversion devices.

A still further object of the invention is to provide an improved spherical plotting and tracking apparatus employing a movable globe, wherein recorded information may be utilized to effect the movements of the globe, and wherein the data required to reproduce or duplicate such movements may be recorded as the globe is made to automatically track a moving object in response to signals supplied to it.

Another feature of the invention resides in the provision of an improved control apparatus in accordance with the foregoing by which separate or combined turning movements of the globe about said axes are effected with simple, easily actuated yet accurate apparatus, such apparatus being readily adapted for automatic cycling operation, or for manual operation or both.

A still further object of the invention resides in the provision of an improved control apparatus and movably mounted globe or spherical member, wherein the movements of the globe may be readily effected by the use of electrical pulses or the like.

Yet another object of the invention is to provide an improved spherical plotter apparatus embodying a globe which is movable about two axes, wherein the movements about both said axes may be readily indicated and the said indications or data accurately stored for further use.

An additional object of the invention is to provide a novel spherical plotter apparatus embodying a globe mounted to be movable about two axes normal to each other, wherein the movements about these axes are given a cyclic variation so as to produce an orbital path or projection of the type followed by satellites and similar heavenly bodies.

Other objects and features reside in the provision of a plotter apparatus, movably mounted globe and control means therefor as above set forth, which is sensitive and quick in its response, relatively accurate, and constituted to a large extent of relatively simple equipment.

Other features and advantages will hereinafter appear.

In the drawings accompanying this specification, similar characters of reference have been used to designate like components, wherever possible throughout the several views, in which:

FIGURE 1 is a diagram illustrating the use of the spherical plotter apparatus of the present invention.

FIG. 2 is a front elevational view of the display screen of the apparatus shown in FIG. 1.

FIG. 3 is a diagrammatic view showing in side elevation the rotatably mounted globe portion and projection system of the apparatus.

FIG. 4 is a diagrammatic representation showing the device of FIG. 3 in a top, plan view.

FIG. 5 is a diagrammatic representation of the apparatus of the invention, showing most of the components.

Figure 6:
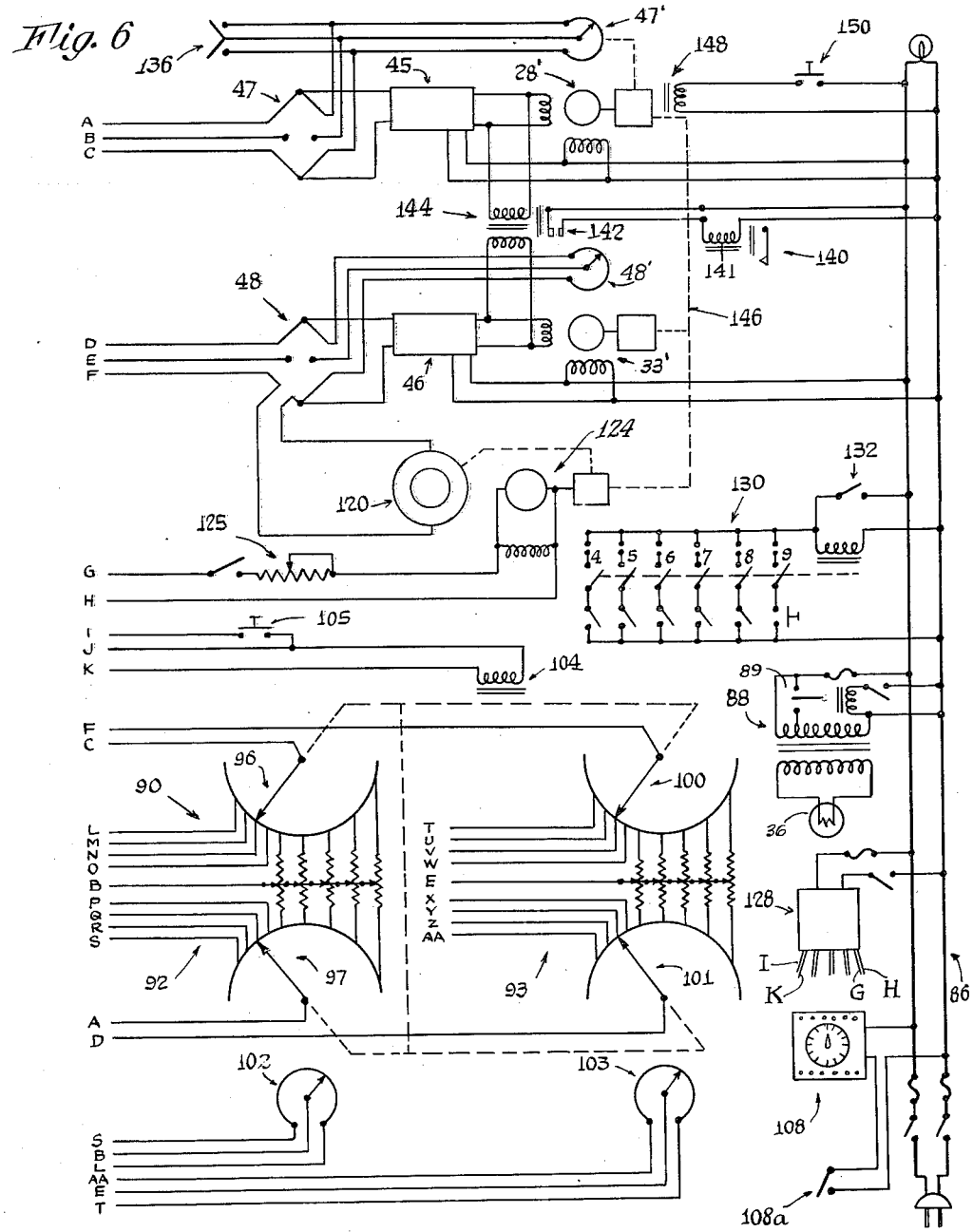
FIG. 6 is a schematic circuit diagram of the apparatus.

As in my copending application above referred to, the apparatus of the present invention may comprise a display field or screen 10 mounted on a suitable support 11 so as to be disposed in an upright or vertical position. To the rear of the screen 10 there is provided, within a housing 12, the major portion of the present spherical plotter apparatus, including various pieces of control equipment associated with a spherical member or globe, which latter is mounted for rotation about two axes normal to each other.

In FIG. 2 a front elevational view of the screen 10 is shown, such screen having a projected image of a map representing a portion of the earth's surface, together with other data described in detail in my above-referred-to copending application.

The rotatably mounted globe portion of the apparatus which is housed within the enclosure 12 is shown diagrammatically in FIGS. 3 and 4. Carried by a base 14 are two bearing uprights or stanchions 15 having pivots 16 which carry a yoke 17 roughly in the shape of the letter U, said yoke having a curved edge 18 extending in a semicircle and along slightly more than one half of the circumference of a spherical member or globe 20, which latter is rotatably carried by the yoke 17. For this purpose, a shaft 21 is provided, disposed diametrically within the globe 20, said shaft projecting beyond one side of the globe and being rotatably carried by the center portion of the yoke 17. The shaft 21 may carry bearings 23 and 24 disposed within and attached to the globe 20.

Adjacent the lower end of the shaft 21, as seen in FIGS. 3 and 4, the globe 20 has a gear 25 meshing with a worm 26 on a drive shaft 27, which latter is turned by a gearhead motor 28 mounted on the yoke 17. Energization of the motor 28 will thus effect rotation of the globe 20 about the shaft 21, as will be readily understood.

By the above construction I have provided a novel mounting means characterized by solely one shaft projecting from the surface of the globe 20 at solely one point thereon, for supporting the globe for rotation about a diametric axis, said globe being further rotatable about a second diametric axis normal to the first, said second axis constituting that defined by the pivots 16 carried in the bearing stanchions 15. By such construction virtually any point on the surface of the globe 20 may be brought to or moved past a fixed location disposed above the base 14 adjacent the globe, as will be now understood.

Powered movement of the globe 20 about the axis defined by the pivots 16 may be effected by the provision of a gear 30 rigidly attached to the yoke 17 and meshing with a worm 31 on a drive shaft 32 which is powered by a gearhead motor 32a rigidly secured to the base 14.

For the purpose of projecting an area of the surface of the globe 20 on the screen 10, an optical system may be provided, including a projector head assembly 33 carried by an upright support 33a fastened to the base 14, said assembly including a hood 34 having a slide holder and mask 35. The slide holder and mask 35 may contain photographically sensitized surfaces whereon the projected image may be photographically recorded. Illumination of the said area of the globe 20 which is to be projected or photographed may be effected by a plurality of lamps 36 and reflectors 37 carried by the upright 33a, a total of four such units being shown in FIGS. 3 and 4. Cooling equipment such as fans 39 may be provided on the base 14, as necessary, to dissipate heat from the lamps 36.

In accordance with the present invention, to enable the globe 20 to be readily driven with the least possible force and power, I provide on the yoke 17 a counterweight 41, as seen in FIGS. 3 and 4, whereby a balance is effected about the axis represented by the pivots 16, thereby greatly reducing the load on the motor 32a and enabling a quicker response to be had when the motor is energized for driving the globe about the horizontal axis.

By the above organization the globe 20 may be completely power driven, and may be readily controlled at either a remote or proximal point, and turning about either one axis or the other, or both axes, may be readily effected.

In accordance with the present invention I further provide automatic and semi-automatic control apparatus for effecting energization of the drive motors 28 and 32a in accordance with given conditions, whereby the movements of the globe 20 may be such as to track or plot the movements of an object with respect to the earth's surface.

For this purpose, the globe 20 is provided with a spherical world map on its exposed surface, and such map may be so arranged that the shaft 21 corresponds with the polar axis of the map and the earth. The axis defined by the pivots 16 would then always pass through the equator of the globe, regardless of the rotative position of the latter about the polar axis, as will be readily understood.

Referring now to FIG. 5, the polar and equatorial motor drive units may include variable speed, gear-changing devices, and are indicated in this figure and in FIG. 6 by the numerals 28' and 33', said units comprising respectively the parts 28, 27, 26, 25 and 32a, 32, 31, 30 and being shown as connected to amplifiers 45 and 46 for the purpose of energization thereby under a very close control. Associated with the amplifiers 45 and 46 are control bridges 47 and 48 respectively, said bridges having movable sliders or the equivalent which are coupled to the motor units 28' and 33' respectively for simultaneous movement. The motor, amplifier and control bridge assemblies indicated by the numerals 28', 45, 47 and 33', 46, 48 are per se well known in the control art, and further details thereof are accordingly not given herein. Such controls are known as continuous, balanced-feed-back controls, and they are effective in providing a precision positioning of the motors and in consequence of the globe 20 by variation of a master control device which may be in the form of a resistance or a control voltage.

As seen in FIG. 5, a plurality of such control resistances may be provided for each of the amplifier-motor groups, to effect desired positioning of the globe 20. For example, the bridge 47 may have connected with it (by suitable switch devices not shown) any one of the variable resistance devices 50, 51, 52 or 53. Also, the bridge 48 may have connected with it by similar switch devices not shown any one of the resistance devices 55, 56, 57 or 58. The different resistance devices in each group may have different ranges of resistance, and may be so organized that by proper adjustment and connection they may effect complete rotation of the globe 20 about the associated axis.

In place of the resistance controls represented by the devices 50—53 and 55—58 for effecting rotation of the globe 20 about the two axes thereof, suitable voltage generators may be provided, which are adaptable for automatic or powered actuation. Such voltage generators, also termed herein "function generators," may be of the type known as sine voltage generators having, for example, an output of from minus 50 millivolts through zero to plus 50 millivolts. The function generators may have various speed ranges, as desired. For example, they may have a speed of one cycle per minute, or one cycle per hour, and may be variable within a wide range from the said speeds.

The resistor devices 50—53 and 55—58 may be connected with a stepping switch and may be power actuated, as by means of a solenoid and ratchet mechanism adapted to advance the switch one step at a time. The resistor devices further may be mechanically coupled, as indicated by the lines 60 and 61 in FIG. 5, whereby one resistor device becomes effective after another has ceased to function, etc. Thus, a sequential operation of the resistor device may be had, and in conjunction with a stepping relay which may be energized by a push button manually operated or automatically energized (as by a timing device or clock or a signal pulse from a magnetic tape record) a control of the movements of the globe 20 about both the axes thereof is readily effected.

In place of the groups of resistor devices 50—53 and 55—58 the function generators 63 and 64 may be connected with the bridges 47 and 48 respectively. Such generators, as with the resistor devices, upset the balance of the bridges, causing the amplifier response thereto to energize the motors 28 and 32a in a manner to restore the bridge balance whereby the motors again come to rest, such operation being accompanied by turning movements of the globe 20 as it is driven by the said motors.

The function generators 63, 64 may supply voltages in small progressive increments to the bridges 47 and 48, and in consequence the globe 20 will be driven in such a manner that successive areas on its surface will be presented to the optical projection system illustrated in FIGS. 3 and 4. Such progressive areas will be the locus of successive points as defined and determined by operation of the function generators 63, 64. Also, the rate at which the said successive points on the globe succeed each other will be precisely equal to the rate of movement of the signal, which may be supplied by the function generators. Where the function generators supply signals which define an orbital ground track, such as the projection of the moon on the earth, or of any other object in space, the areas of the globes 20 which are projected by the optical system of FIGS. 3 and 4 will be a simualted view of the ground track.

Periodically a feed-back connection may be established between the function generators 63, 64 and the slide elements of the bridges 47, 48, to standardize the voltages or the index positions between these otherwise independent one-way control circuits.

It will be understood that the function generators 63, 64 may be manually operated, or else they may be automatically operated by suitable power equipment responsive to signals or other excitation.

Instead of providing manual, preselected or generated signals either automatically controlled or otherwise, there may be employed a series of random variables for controlling the globe 20, as by playback of signals which are previously recorded on a magnetic tape or the like. Such arrangement is also depicted in FIG. 5, wherein there is shown a tape recorder 68 connected to feed into a converter 69 which may, for example, be a well-known commercially available digital to analog type of converter. The converter 69 may then feed the signals to the bridges 47 and 48 instead of the function generators or the resistor devices previously described. With such organization great flexibility is had, since a given set of signals may be recorded at one time and place, and thereafter utilized in connection with the plotter projector-simulator apparatus, to enable flights or orbits to be studied and presented to various groups for instruction and other purposes.

With such arrangement the apparatus may be used for recording, displaying and predicting the ground track of missiles and satellites in ballistic flights. Co-ordinate signals which have been computed from observations may be received and stored in the tape unit at transmission speed, and then played back in the plotter-projector for readout. After an orbit has been established from the data received from the initial observations, then the function generators 63, 64 may be adjusted to duplicate the said orbit. As the following observed signals are received, they may then be used to standardize or supervise the generators, which will continue to control the display between the sets of observations. The projected display, which will lag the real time position of the object by the period which is required in processing observations and standardizing, may be brought up to date manually, or may be advanced for the purpose of obtaining predictions.

In accordance with the present invention means are provided to enable the continuous plot to be logged, and to enable logging of any tracks which are controlled by manual or stepped input signals. For this purpose, well-known commercially available encoders comprising coding disks or elements 72 and 73 may be provided, one on the shaft 21 adjacent the yoke 17 and the other on one of the pivots 16 whereby said elements will rotate as the globe 20 rotates. The coding elements may provide digital data comprising a digitized signal unique for each increment of shaft rotation, which may be fed into a well-known and commercially available digital readout device 75 such as an electronic voltmeter counter normally included in the encoder. Such indicator or encoder devices would then indicate latitude, longitude and distance on a great circle, in a code which is compatible with the tape recorder 68. The said encoder per se forms no part of the present invention, and accordingly details thereof are not given herein. The encoder in conjunction with the present spherical plotter system shown in FIG. 5 is novel, so far as I am aware. The output of the digital readout device 75 is thus a signal which is representative of the position of the sphere 20, and may be at all times recorded on the recorder 68 except when the latter is being used for the receipt of observation data. Such readout information may be played through and utilized in the same manner as other data. Thus, a flight may be logged during many hours and replayed in minutes for study or similar purposes.

The above organization thus provides for continuous plotting, marking, readout and display of spherical co-ordinate data. Also, in accordance with the present invention I provide means for the storage and recall of other data, such as altitude, gravity anomalies, magnetic density, etc. and such data may be related specifically to the respective points on the track. This means may comprise a coating on the sphere or globe 20, in the form of a magnetic or static storage film, and may further comprise a read-write dual-unit recording head located in juxtaposition to the surface of the globe. The magnetic surfacing on the globe 20 may be of a suitable magnetic tape or magnetic material now in common use and well understood in the art. Referring to FIGS. 3–5, I provide a transducer head 78, mounted on an arm 79 which is pivoted on a bearing stanchion 80 secured to the base 14 of the globe mounting structure. The arm 79 may be pivotally moved by means of a solenoid 82, thereby to position the transducer 78, either close to the surface of the globe in an operable relationship therewith, or else in a retracted position, the latter being shown in FIGS. 3 and 4. The transducer head 78 may also be connected with the tape recorder 68 as shown in FIG. 5, to supply signals or other data thereto.

A schematic diagram showing the connections of the various components making up the apparatus of the present invention is given in FIG. 6. The power supply line is indicated at 86. From this line the lamps 36 may be energized through the use of a suitable transformer, switches, relays etc. indicated generally by the number 88. In this diagram connecting wires or leads which have similarly lettered terminations are to be connected together. Replacing the resistor devices 50—53 and 55—58 is a multi-deck selector switch assembly indicated generally by the numeral 90, said assembly comprising two sets of resistor devices 92 and 93 having a plurality of adjustable resistors as shown, in the form of potentiometer controls. The one set of potentiometer controls 92 is connected with contacts of a pair of coupled selector switches 100 and 101. The pair of switches 96, 97 is connected with the bridge 47 by the indicated connections, and the selector switches 100, 101 are connected with the bridge 48 by the indicated connections. Also, a pair of manually operable potentiometer controls 102 and 103 may be provided, connected respectively with the switches 96, 97 and 100, 101 to provide a manual control. All of the switches 96, 97, 100 and 101 may be automatically advanced step by step by means of a stepping magnet 104 whose energization may be manually controlled by a switch 105. Or, if a pulse transmitting device is connected with the two terminals J, K of the magnet 104, the selector switches 96, 97 and 100, 101 may be automatically advanced with an intermittent movement.

Such energization of the stepping magnet 104 may, for example, be supplied through the use of a relay operated by a pulse from a magnetic tape which also carries a voice commentary on the various displayed areas as they are made to appear in response to the position of the selector switches 96, 97 and 100, 101.

It will be understood that actuation of the selector switches 96, 97 and 100, 101 alters the balance condition of the bridges 47, 48 respectively, and in re-establishing such balance the motor-gear assemblages 28', 33', will be energized by the amplifiers 45, 46, said motor-gear assemblages driving not only the globe 20 but also the slide wire parts 47' and 48' of the bridges, these latter for the purpose of re-establishing balance. Accordingly, the movements of the selector switches 96, 97 and 100 101 will effect turning movements of the globe 20 in accordance with the speed of travel of the switches and the values of the potentiometer control devices connected with the selector switches. Manual adjustment is provided by the manually operable potentiometer controls 102 and 103, as already mentioned. The selector switches 96, 97 and 100, 101 may be also utilized to connect various inputs to the bridges 47 and 48, the bridge 47 controlling the east-west rotation of the globe and the bridge 48 controlling the north-south rotation of the globe. Beside the connections to the manually operable potentiometer controls 102 and 103 which are effected when the selector switches 96, 97 and 100, 101 are in their leftmost or starting positions as viewed in FIG. 6, external controls may be connected to the bridges 47 and 48 when the selector switches are in their #2 positions, involving the wires M, R, U, and Z. Such external controls might supply voltage pulses or resistance values controlled by a magnetic tape recorder or similar device. The #3 positions of the switches 96, 97 and 100, 101, involving the wires N, Q, V, and Y might connect to the bridges 47 and 48 another and different set of input voltages, which may be obtained from teletype transmissions of current observational computations.

It will be further understood that the five sets of potentiometers associated with each of the two pairs of selector switches may be preset to produce a series of preselected map locations for projection. Such preset potentiometers would, as will be understood, alter the balance of the bridges 47, 48 to effect the desired positionings of the globe.

Further, in accordance with the present invention I provide a novel means for effecting an orbital movement of the globe 20 as the selector switches 96, 97 and 100, 101 are advanced step by step. This means comprises a sine generator device 120 adapted to provide both positive and negative voltage values in accordance with a sine function for introduction into the bridge 48 which controls the motion of the globe 20 about the horizontal axis defined by the pivots 16. Accordingly, the sine generator 120 will effect latitude displacements of the globe 20 as it is turning about its polar axis in such a manner that an orbital path will be defined by the projected areas of the globe. The sine generator 120 may be driven by a motor and gear unit 124 under the control of a rheostat 125, said unit being energized from a source of direct current voltage 128 connected with the line 86. The voltage source 128 may also be used to supply power to the bridges 47 and 48, and to the sine generator device 120.

A bank of program switches 130, in the form of a multiple contact relay device, may be provided under the control of a manually operable switch 132, for the purpose of setting up other control programs. The bank of switches 130 may be utilized to control the stepping magnet 104 by which various desired operation procedures may be set up for the resistor device unit 90. The bank of program switches 130 may be arranged for convenient connection of various combinations of several functions, for controlling besides the stepping magnet 104 other functional components of the apparatus, as may be now understood such as the gear box 148, lamps 36, etc. as by shunting the switch 150 by the switch unit 4 of the program bank 130, shunting the relay contacts 89 by the switch unit 5 of the bank 130, etc., this being effected by simply closing the switch 132. The actuation of the switch 132 may be effected, through suitable means, by a single pulse from a tape or other signal source.

There may be further provided an interval timer 108, adapted to be controlled by a suitable switch 108a for the purpose of switching a program display on or off as desired. For public exhibitions the interval timer 108 might be set to start when a push button is pressed by a visitor, and to run through a three-minute display of an orbital path, with appropriate commentary. The interval timer may be connected in parallel with the switch 132, and the on-off switch for the timer 108a may be located at a remote point, as will be understood.

The start and stop of the sine generator 120 may be programmed as for a simulated launching, by interposing in either of the leads G or H an automatic switch, as for example the switch represented by the relay bank 130. The contacts 7 and 8 of the relay may be used for this purpose, for instance. Then, when the relay control switch 132 is closed, it will initiate an orbital cycle at a point and time determined by the program desired. At this moment, or at any later time, the rate of movement or rotation of the globe about both axes may be changed from a rate on the order of one revolution per minute to a rate on the order of one revolution per hour or per two hours, by changing the gearing associated with the driving motors for the globe. Such gearing change will be described in detail below.

It will be understood from the foregoing that the latitudinal displacement of the globe is automatically changed to correspond directly with the changing latitude of the orbiting object by means of the sine generator 120, at the same time that the longitudinal motion of the globe agrees with the corresponding relative east-west motion of the object. In this way, the orbital ground track is automatically developed, with no signals or manual controls required except for correction as observational data is available. A manually operable switch 136 may be connected with the slide wire device 47' as shown, to cut off the latter when desired for the purpose of halting rotation of the globe 20 about the vertical or polar axis.

Also, in accordance with the invention a marking stylus 140 may be provided, under the control of a magnet 141 which latter is energized through a switch 142 responsive to concurrent operation of the amplifiers 45, 46 by means of a null type magnet 144 having a pair of opposed windings, connected as shown. The marking stylus 140 is connected for energization from the main supply line, which may carry 60 cycle alternating current. When the stylus is made operative it will vibrate, and will apply closely spaced intermittent marks showing on the globe as a continuous line, which may then be representative of the path of the satellite. Other energization may be utilized for the marking stylus. For example, when a one second pulse is applied, a time-spaced mark is made, one for each second. Where, as shown in FIG. 6, the stylus energizing current is controlled by the null-type relay 144 in the balancing motor circuits, the stylus is made operative only when both motors have come to a position of "no-error signal." In other words, the marking of the globe will take place when the display is on a preselected point. The relay contacts 142 may be bridged by a switch controlled by another means, and such switch may be inserted by means of a plug and jack arrangement, as will be readily understood.

The motor-gear units 28', 33' and 124 may be provided with clutches in their gearing, and such clutches may be all coupled for simultaneous operation, as indicated by the broken line 146. Such operation of the clutches may be effected by a single magnet 148 under the control of a manually operable switch 150, as shown. Release of the clutches may enable adjustments to be made with respect to the globe and the driving motors. Preferably the motor-gear units 28', 33' and 124 are multi-speed devices and may for example have a range as great as 60 to 1. That is, the gearing may be such that the globe may be rotated about both axes at a rate on the order of one revolution per minute, or a rate of one revolution per hour or every two hours. Thus, the motors may be coupled to effect a real-time display on the order of hours per revolution, or a review and demonstration display in time measured in minutes.

It will be understood from the foregoing that by the provision of the selector switches 96, 97, 100 and 101 in conjunction with the preset potentiometer devices indicated the globe may be moved through a succession or series of predetermined distances, to display desired areas in succession, as might be required by a travelogue or other axis orientation. And, to move the globe about either axis in small increments the manually operable potentiometers 102 and 103 may be actuated. Or, incremental voltages may be applied to the inputs of the bridges 47 and 48, as represented by signals coming from magnetic tape or teletype apparatus. For these latter, representing external controls, the stepping magnet 104 would be energized to position the selector switches 96, 97, or 100, 101 on either the second or third positions thereof, the third position being indicated in FIG. 6 and the second position involving the wires M, R, U and Z.

Conveniently the manually operable potentiometers 102 and 103 together with the manually operable switch 105 may be constituted as a separate unit located remote from the remainder of the equipment. Such a unit is indicated in FIG. 1, by the letters RC.

The tape recorder 68 may receive its data from a suitable receiver device 151 connected for example by a land line 152 with a transmitter device 153 which in turn is connected to a computor 154 to receive data therefrom. The computor 154 may include a suitable radio receiver, connected with an antenna 155 for receiving signals from the satellite 160. The computer 154 may be of a well-known type, and since it per se forms no part of the present invention, details are not given here. The computer receives data from equipment which provides signals representative of the position of the satellite, and converts the same into an output in coordinate form which may then be further converted to analog form by the converter 69.

It will be understood from the foregoing that I have provided a novel and improved spherical tracking, plotting and projection apparatus which will effectively trace and display the positions and movements of objects traveling with respect to the surface of the earth or other sphere. The apparatus is semi-automatically operative, and involves power-controlled means for effecting movements of the globe about both axes and also means for effecting latitudinal displacement of the globe to enable an orbital path to be readily followed and displaced. The apparatus is relatively simple in its construction, relatively small and compact, and characterized by reliable and effective operation.

Variations and modifications may be made within the scope of the claims, and portions of the improvements may be used without others.

I claim:

1. The combination of a globe having a map on its surface and having means characterized by solely one shaft projecting from its surface at solely one point thereon, for supporting the globe for rotation about a diametric axis; a semi-circular yoke carrying intermediate its ends the said means, said yoke extending along substantially half the circumference of the globe; a base; means engaged with diametrically opposite portions of said yoke, pivotally mounting the same on the base about an axis normal to the axis of said shaft; motive means carried by said yoke, for turning the globe about the axis of the said shaft; and motive means including a drive connected to the base, for turning the yoke about the axis of the said pivotal mounting; a magnetizable surfacing on said globe, adapted to store data; means including an optical system for projecting any predetermined area, of the map on said globe, which is disposed at a fixed location above the said base and adjacent the globe; and a transducer head and means for mounting the same adjacent the globe at a point diametrically opposite the said fixed location and in operable relationship to the said surfacing.

2. The invention as defined in claim 1 in which the means mounting the transducer head provides for adjusting movement of the latter between an advanced position close to the said surfacing and a retracted position removed from the surfacing, and in which there are motive means for actuating the said transducer head.

3. The combination of a globe; compound mounting means supporting the globe for continuous rotation about two axes normal to each other; motive means for continuous driving the globe about the said axes; balancing-type control means connected with said motive means for controlling energization thereof, said control means including two control devices automatically actuated simultaneously with movement of the globe respectively about the axes thereof to enable a balance to be effected by driving the globe to a predetermined rotative position; and signal means connected to said control means for effecting an unbalance thereof to cause the motive means to drive the globe to a new rotative position during the seeking of a new balance, said signal means comprising a digital-to-analog converter and a signal receiver connected to said converter.

4. The invention as described in claim 3 in which there is a recorder connected between the signal receiver and converter, to enable the signals to be stored and subsequently used.

5. The invention as defined in claim 3 in which the signal means includes a computer and means feeding information thereto, said computer being coupled to the signal receiver and the said converter, and supplying data to the latter.

6. The combination of a globe; compound mounting means supporting the globe for continuous non-reversing rotation about two axes normal to each other; motive means for continuous driving the globe about the said axes; balancing-type control means connected with said motive means for controlling energization thereof, said control means including two control devices automatically actuated simultaneously with movement of the globe respectively about the axes thereof to enable a balance to be effected by driving the globe to a predetermined rotative position; progressive continuously changing signal means comprising a plurality of resistors for effecting consecutively-occurring different degrees of unbalance of the control means; and powered switching means including a switch motive means for successively connecting said devices to the control means, to cause the motive means to continuously turn the globe to successively new rotative positions by virtue of the control means seeking new conditions of balance, said signal means causing a progressive and non-reversing continuous turning of the globe about axes determined by the said compound mounting means, said switching means including selector switches and the switch motive means which powers the switching means comprises a stepping magnet.

7. The combination of a globe; compound mounting means supporting the globe for continuous rotation about two axes normal to each other; motive means for continuous driving the globe about the said axes; balancing-type control means connected with said motive means for controlling energization thereof, said control means including two control devices automatically actuated simultaneously with movement of the globe respectively about the axes thereof to enable a balance to be effected by driving the globe to a predetermined rotative position; and signal means connected to said control means for effecting an unbalance thereof to cause the motive means to drive the globe to a new rotative position during the seeking of a new balance; means connected with the globe and turnable therewith, for providing electrical signals coded to the globe positions; a converter for changing said signals to analog signals; and a recorder for storing the said analog signals for subsequent use with the said signal means.

8. The combination of a globe; compound mounting means supporting the globe for continuous non-reversing rotation about two axes normal to each other; motive means for continuous driving the globe about the said axes; balancing-type control means connected with said motive means for controlling energization thereof, said control means including two control devices automatically actuated simultaneously with movement of the globe respectively about the axes thereof to enable a balance to be effected by driving the globe to a predetermined rotative position; and progressive continuously changing signal means connected to said control means for effecting a continuous unbalance thereof to cause the motive means to continuously turn and drive the globe to continuously new rotative positions during the seeking of a new balance, said signal means comprising a digital-to-analog converter; a magnetizable surfacing on said globe, adapted to store data; pick-up transducer means associated with said surfacing, for providing electrical signals as the globe is rotated; and a recorder for storing the said signals, said signal means causing a progressive and non-reversing continuous turning of the globe about axes determined by the said compound mounting means.

9. The combination of a globe; compound mounting means supporting the globe for rotation about two axes normal to each other; motive means for driving the globe about the said axes; balancing-type control means connected with said motive means for controlling energization thereof, said control means including two control devices automatically actuated simultaneously with movement of the globe respectively about the axes thereof to enable a balance to be effected by driving the globe to a predetermined rotative position; and signal means connected to said control means for effecting an unbalance thereof to cause the motive means to drive the globe to a new rotative position during the seeking of a new balance; a magnetizable surfacing on said globe, adapted to store data; pick-up transducer means associated with said surfacing, for providing electrical signals as the globe is rotated; and a recorder for storing the said transducer signals; means connected with the globe and turnable therewith, for providing electrical signals coded to the globe positions; a converter for changing said signals to analog signals, said converter being connected to feed the said recorder for storage of the said analog signals independently of storing of the transducer signals and at another time.

10. The combination of a globe; compound mounting means supporting the globe for rotation about two axes normal to each other; motive means for driving the globe about the said axes; balancing-type control means connected with said motive means for controlling energization thereof, said control means including two control devices automatically actuated simultaneously with movement of the globe respectively about the axes thereof to enable a balance to be effected by driving the globe to a predetermined rotative position; and signal means connected to said control means for effecting an unbalance thereof to cause the motive means to drive the globe to a new rotative position during the seeking of a new balance, said signal means including a cycling, generating device adapted to produce a predetermined wave form thereby to introduce a cyclic variation in the turning movement of the globe about one axis thereof.

11. The combination of a globe; compound mounting means supporting the globe for rotation about two axes normal to each other; motive means for driving the globe about the said axes; balancing-type control means connected with said motive means for controlling energization thereof, said control means including two control devices automatically actuated simultaneously with movement of the globe respectively about the axes thereof to enable a balance to be effected by driving the globe to a predetermined rotative position; and signal means connected to said control means for effecting an unbalance thereof to cause the motive means to drive the globe to a new rotative position during the seeking of a new balance, said signal means including a cycling, generating device adapted to produce a predetermined wave form thereby to introduce a cyclic variation in the turning movement of the globe about one axis thereof; and means for changing the frequency of the said cycling generator.

References Cited in the file of this patent

UNITED STATES PATENTS

| | | |
|---|---|---|
| 1,384,801 | Ferrari | July 19, 1921 |
| 2,364,539 | Link | Dec. 5, 1944 |
| 2,431,847 | Van Dusen | Dec. 2, 1947 |
| 2,483,216 | Marshall | Sept. 27, 1949 |
| 2,687,580 | Dehmel | Aug. 31, 1954 |
| 2,714,199 | Adams et al. | July 26, 1955 |
| 2,754,597 | Sylvester | July 17, 1956 |
| 2,825,043 | Abbott | Feb. 25, 1958 |
| 2,862,781 | Baumeister | Dec. 2, 1958 |
| 2,882,525 | Young | Apr. 14, 1959 |
| 2,883,768 | Fraser | Apr. 28, 1959 |
| 2,885,791 | Gunning | May 12, 1959 |
| 2,924,768 | Ferrand et al. | Feb. 9, 1960 |